No. 846,530. PATENTED MAR. 12, 1907.
A. VANDENAMEELE.
WATER ELEVATOR.
APPLICATION FILED JAN. 24, 1906.

2 SHEETS—SHEET 1.

WITNESSES.
INVENTOR.
Alphonse Vandenameele

No. 846,530. PATENTED MAR. 12, 1907.
A. VANDENAMEELE.
WATER ELEVATOR.
APPLICATION FILED JAN. 24, 1906.

2 SHEETS—SHEET 2.

UNITED STATES PATENT OFFICE.

ALPHONSE VANDENAMEELE, OF FOREST, NEAR BRUSSELS, BELGIUM.

WATER-ELEVATOR.

No. 846,530.            Specification of Letters Patent.            Patented March 12, 1907.

Application filed January 24, 1906. Serial No. 297,542.

*To all whom it may concern:*

Be it known that I, ALPHONSE VANDENAMEELE, a subject of the Belgian King, residing at Forest, near Brussels, Belgium, have invented new and useful Improvements in Water-Elevators; and I do hereby declare the following to be a full, clear, and exact description of the same.

My present invention relates to improvements in water-elevators, the object being to provide a water-elevator the casing of which is adapted to completely cover the opening of the well and which elevates water by means of buckets through the medium of a continuous-drive movement imparted to the main shaft of the device.

Figure 1:
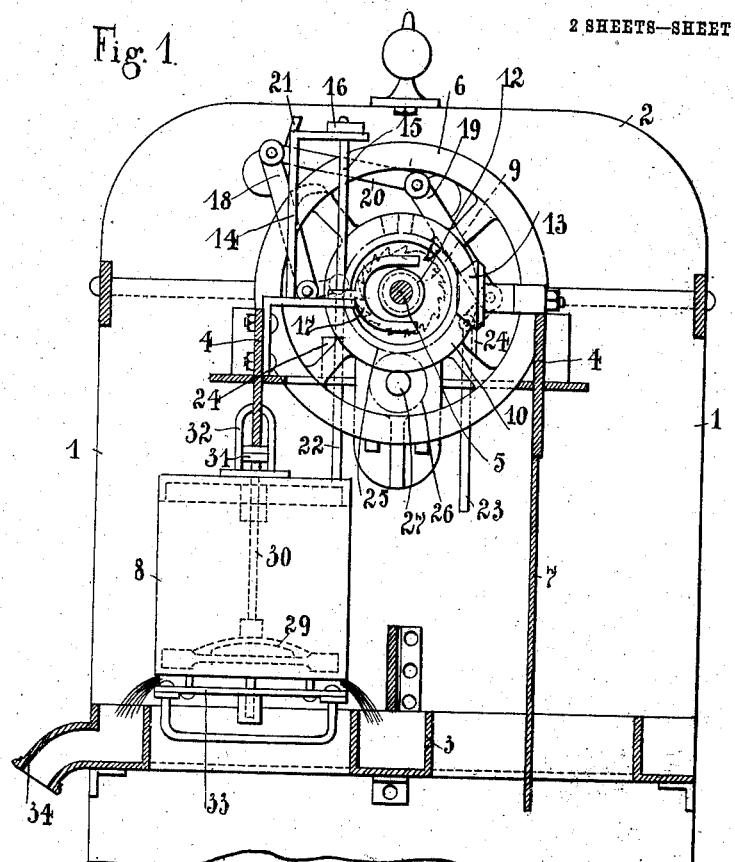
Figure 3:
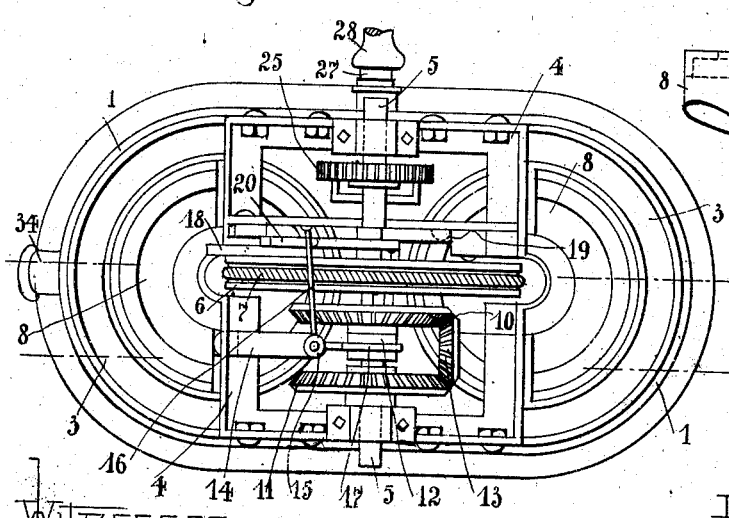
Figure 2:
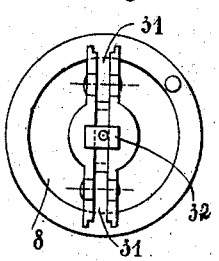
Figure 4:
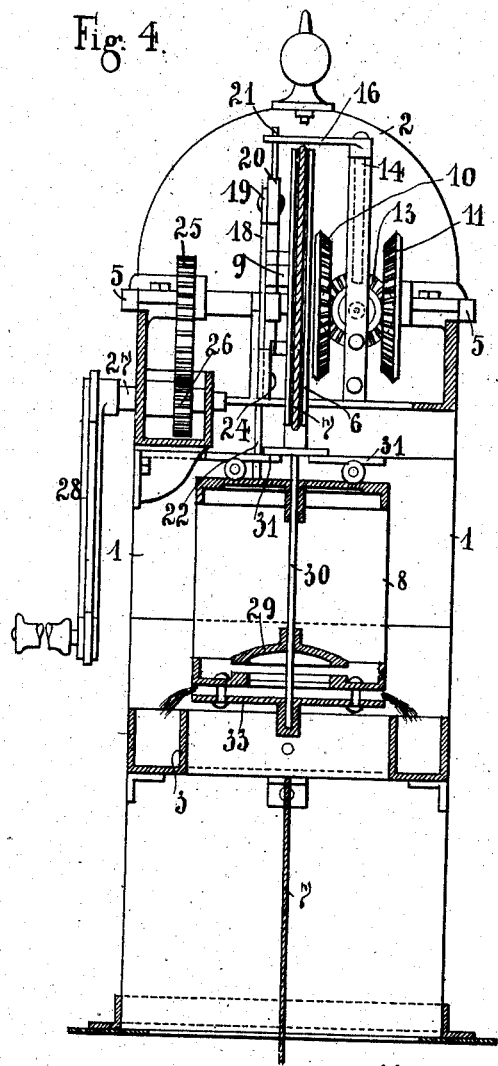
Figure 5:
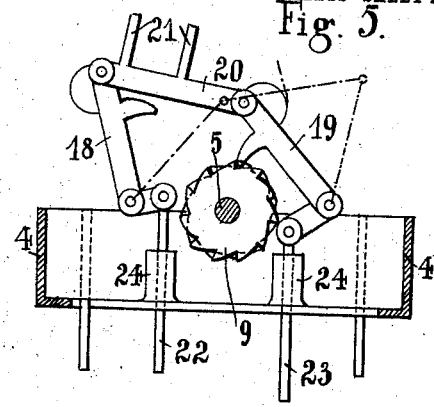
Figure 7:
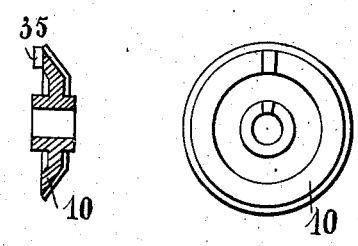
Figure 6:
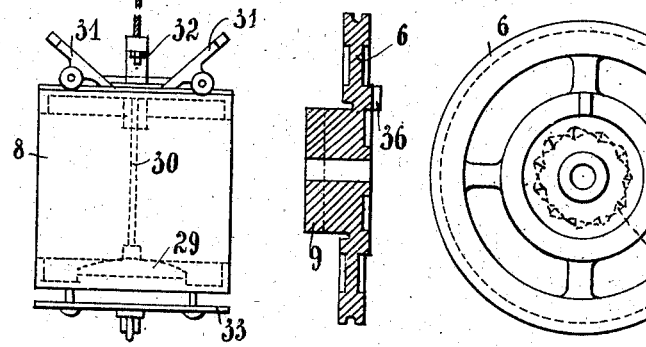

In the accompanying drawings, Figure 1 is a vertical longitudinal sectional view of the apparatus. Fig. 2 is a plan view of a bucket. Fig. 3 is a plan view of the apparatus with the cover thereof removed. Fig. 4 is a vertical cross-section of the apparatus. Fig. 5 shows details of the pawl-and-ratchet mechanism. Fig. 6 shows details of the elevator-pulley, and Fig. 7 shows details of one of the conical gear-wheels coöperating with the elevator-pulley.

The complete water-elevator is housed within a metal casing 1 made of an oblong cross-section, capable of completely covering the opening of the well, said casing being provided with a suitable cover or lid 2. Arranged in the lower part of the casing 1 is a round flat basin or trough 3, made of cast-iron and having two circular holes for the passage of the buckets hereinafter described, and arranged in the upper part of said casing 1 is cast-iron frame 4, provided with suitable bearings wherein the main shaft 5 is journaled. The latter carries a grooved elevator-pulley 6, around which passes a rope or the like 7, to the ends of which are attached the buckets 8 8. The hub of the pulley 6 is provided with a double ratchet 9. Arranged on one side of the pulley 6 are two conical gear-wheels 10 11, each of which is provided with a clutch-surface adapted to be engaged by a clutch-sleeve 12, slidably arranged on a key secured to the main shaft 5. The elevator-pulley 6 and the two conical gear-wheels 10 11 are loose on the shaft 5. Arranged between the gear-wheels 10 11 is a toothed pinion 13, rotating on a stud-shaft carried by the frame 4, and arranged in front of said pinion is a post or standard 14, supporting a vertical rocking shaft 15, provided at its top with a horizontal drive-arm 16 and at its bottom end with a fork 17, engaging a circular groove in the clutch-sleeve 12.

Arranged in proximity to the elevator-pulley 6 is a pawl mechanism comprising two cranked pawls 18 19, connected at the top by means of a link 20, provided with a fork 21, adapted to engage the drive-arm 16 of the vertical shaft 15 for the purpose of actuating the latter, as hereinafter described. The pawls 18 19 are pivotally connected at their bottom ends with two bolts 22 23, adapted to be raised and lowered in two sockets 24 and serving to actuate the pawls alternately when the one or the other bucket 8 engages or strikes against them at the end of its upward movement.

The main shaft 5 may be actuated by means of a gear-wheel 25, meshing with a pinion 26, the shaft 27 of which is provided with a crank 28. The latter may also be attached directly to the main shaft 5, or a suitable drive-pulley may be substituted therefor.

The buckets 8 8, attached to the rope 7, are formed of cylindrical body made of sheet metal, the bottom of which is provided with a valve 29, provided with a stem 30, which may be raised by means of two pivoting levers 31 31, pivoted on a small cross-bar provided with an attaching-yoke 32. Below the bottom of each bucket and at a given distance therefrom is secured a false bottom 33, serving to guide the water flowing out from the bucket, as hereinafter described.

The above-described apparatus operates as follows: When the crank 28 or the drive-pulley and the like is rotated, one of the buckets is moved upwardly, while the other is moved downwardly. The raised bucket strikes, at the end of its improved movement, with its pivoting levers 31 31 against the frame 4, so that said levers are actuated to raise the valve 29 of the bucket, whereby the water is permitted to flow out therefrom circularly between the bottom of the bucket and the false bottom 33, said water being received into the flat basin or trough 3, from which it flows outwardly through the nozzle 34. At the same time the upper rim of the bucket engages the bolt 22 and raises the same to actuate the mechanism 18 19, which by its reversing motion engages the ratchet 9 to prevent the elevator-pulley 6 from rotating backwardly, while the fork 21 of the link 20 moves the clutch-sleeve 12 longitudinally on its key through the agency of the arm 16, vertical shaft 15, and fork 17. Thus said clutch-sleeve engages the hub of the conical gear-wheel 10, which is then rotated in a direction opposite to the rotation of the gear-wheel 11, and when said wheel 10 has completed one revolution its cam 35 will engage the cam 36 of the pulley 6 to impart the same rotating movement to the latter. The purpose of this arrangement is to permit the bucket to be completely emptied before the pulley 6 is actuated in opposite direction. The emptied bucket is then again lowered, while the full bucket is raised to be emptied in turn at the end of its upward movement.

It will be seen that the raising and lowering of the buckets are produced in a continuous way without it being necessary to stop the drive movement or change the direction thereof.

It is evident that changes and modifications may be made in the minor details of construction and relative arrangement of the several parts without departing from the scope of the invention.

Having fully described my invention, what I claim, and desire to secure by Letters Patent, is—

1. In a water-elevator the combination with a completely-closed casing, adapted to cover the opening of a well, a flat basin or trough in the lower part of said casing, and two circular openings in said trough for the passage of the elevator-buckets: of a suitable frame stationarily arranged in the upper part of the casing, a main drive-shaft journaled on said frame, and means for imparting movement thereto from the outside of the casing, a loose elevator-pulley on said main shaft, two loose conical gear-wheels on the latter on one side of the pulley, and an intermediate toothed pinion meshing with the gear-wheels: a cam on one side face of the elevator-pulley and a cam on the opposite side face of the adjacent gear-wheel, said cams being adapted to engage one another, when the gear-wheel is rotated in either direction: a suitable clutch arranged and longitudinally movable between said conical gear-wheels, a rope passing around the elevator-pulley and a bucket attached to each end of said rope: a suitable valve in the bottom of each bucket: a double ratchet on the hub of the elevator-pulley: two pawls arranged on opposite sides of said double ratchet: a link connecting the upper ends of said pawls: a vertical rocking shaft, journaled on the frame, a suitable connection between said rocking shaft and the connecting-link: a suitable connection with said rocking shaft and the clutch, means for engaging one pawl with the double ratchet and actuating said clutch, when a bucket is arrived at the end of its upward movement: means for opening the valve of the bucket at this moment, and means for directing the discharged water into said trough, substantially as set forth.

2. In a water-elevator the combination with a completely-closed casing, adapted to cover the opening of a well, a flat basin or trough in the lower part of said casing, and two circular openings in said trough for the passage of the elevator-buckets: of a suitable frame stationarily arranged in the upper part of the casing, a main drive-shaft journaled on said frame, and means for imparting movement thereto from the outside of the casing, a loose elevator-pulley on said main shaft, two loose conical gear-wheels on the latter on one side of the pulley, and an intermediate toothed pinion meshing with the gear-wheels: a cam on one side face of the elevator-pulley and a cam on the opposite side face of the adjacent gear-wheel, said cams being adapted to engage one another, when the gear-wheel is rotated in either direction: a suitable clutch arranged and longitudinally movable between said conical gear-wheels, a rope passing around the elevator-pulley and a bucket attached to each end of said rope: a suitable valve in the bottom of each bucket: a double ratchet on the hub of the elevator-pulley: two pawls arranged on opposite sides of said double ratchet: a link connecting the upper ends of said pawls: an upwardly-projecting fork on said link: a vertical rocking shaft journaled on the frame: a horizontal arm on the upper end of said rocking shaft adapted to be engaged and rotated by said fork: a suitable fork on the lower end of said rocking shaft and suitably connected with said clutch: means for engaging one pawl with the double ratchet and actuating said clutch when a bucket is arrived at the end of its upward movement: means for opening the valve of the bucket at this moment, and means for directing the discharged water into said trough, substantially as set forth.

3. In a water-elevator the combination with a completely-closed casing, adapted to cover the opening of a well, a flat basin or trough in the lower part of said casing, and two circular openings in said trough for the passage of the elevator-buckets: of a suitable frame stationarily arranged in the upper part of the casing, a main drive-shaft journaled on said frame, and means for imparting movement thereto from the outside of the casing, a loose elevator-pulley on said main shaft, two loose conical gear-wheels on the latter on one side of the pulley, and an intermediate toothed pinion meshing with the gear-wheels: a cam on one side face of the elevator-pulley and a cam on the opposite side face of the adjacent gear-wheel, said cams being adapted to engage one another, when the gear-wheel is rotated in either direction: a suitable clutch arranged and longitudinally movable between said conical gear-wheels, a rope passing around the elevator-pulley and a bucket attached to each end of said rope: a suitable valve in the bottom of each bucket: a double ratchet on the hub of the elevator-pulley: two pawls arranged on opposite sides of said double ratchet: a link connecting the upper ends of said pawls: an upwardly-projecting fork on said link: a vertical rocking shaft journaled on the frame: a horizontal arm on the upper end of said rocking shaft adapted to be engaged and rotated by said fork: a suitable fork on the lower end of said rocking shaft and suitably connected with said clutch: a laterally-projecting arm on the lower end of each pawl, a vertically-movable bolt, pivotally connected with said arm, a suitable guide-socket secured to the frame for guiding said bolts which are adapted to be alternately engaged and raised by the buckets when the same are arrived at the end of their upward movement, means for opening the valve of each bucket when it is arrived at the end of its upward stroke, and means for directing the discharged water into said trough, substantially as set forth.

In testimony whereof I have signed my name to this specification in the presence of two subscribing witnesses.

ALPHONSE VANDENAMEELE.

Witnesses:
CHARLES HONOLD,
GREGORY PHELAN.